Patented Oct. 24, 1950

2,526,702

UNITED STATES PATENT OFFICE 2,526,702

PREPARATION OF LACTONES

Curtis W. Smith, Berkeley, Calif., assignor to Shell Development Company, San Francisco, Calif., a corporation of Delaware No Drawing. Application September 20, 1948, Serial No. 50,253

11 Claims. (Cl. 260—344)

1

This invention relates to a process for the preparation of lactones. The invention relates particularly to a process for the preparation of delta-lactones of open-chain oxy-carboxylic acids. Certain novel lactones prepared by the process form a further part of the invention.

No practicable process is known for directly converting open-chain dialdehydes, especially aliphatic dialdehydes, such as glutaraldehyde, to the isomeric lactones of delta-oxy carboxylic acids. Meerwein (Berichte, vol. 53, pp. 1829 to 1835) attempted to convert alpha,alpha,gamma-trimethyl-beta-ethylglutaraldehyde to a lactone by treatment with an alcoholic solution of potassium methylate. However, it was found necessary to first prepare the potassium salt of the hydroxy acid and then to convert the salt by acidification to the lactone, and the yield of the product was undesirably low.

It is known that mono-aldehydes can be converted to esters by treatment under suitable conditions with aluminum alcoholates of lower aliphatic alcohols. Because of the bifunctional nature of aliphatic 1,5-dialdehydes, and their great reactivity, it would be expected that treatment of aliphatic 1,5-dialdehydes with aluminum alcoholates would result in the formation of undesired polymers and negligible amounts of lactone. Dialdehydes, such as glutaraldehyde, having two hydrogen atoms attached to each carbon atom in position alpha and which polymerize even spontaneously upon standing, would be expected to be especially prone to form polymers under the influence of active agents such as aluminum alcoholates. Treatment of glutaraldehyde with, for example, even minute amounts of bases such as potassium hydroxide, sodium hydroxide or potassium methylate results in rapid, substantially quantitative formation of polymers.

An object of the present invention is a method for the direct conversion of 1,5-dialdehydes, especially 1,5-dialdehydes having unsubstituted alpha carbon atoms, to lactones of delta-hydroxy carboxylic acids isomeric thereto. New and useful lactones are further objects of the invention.

Other objects of the invention will become apparent hereinafter.

It unexpectedly has been discovered in accordance with the invention that open-chain 1,5-dialdehydes may be converted directly to lactones of delta-oxy carboxylic acids, by treatment in a liquid phase with an aluminum alcoholate of a lower aliphatic monohydric alcohol, preferably in the presence of a non-hydroxylated diluent or solvent and, when the dialdehyde is unsubstituted

2 in the alpha positions, preferably within the range of from 20° C. to about 60° C. After the treatment, the aluminum alcoholate may be destroyed, if desired, to facilitate subsequent operations, as by addition of a trace of water to the mixture, and the desired lactone recovered as by distillation of the mixture. Yields of the lactone greater than 80% of theory may be obtained.

The process of the invention is applicable to the direct conversion of any aliphatic 1,5-dialdehyde to the isomeric lactone or lactones of delta-hydroxy aliphatic carboxylic acid. Symmetrical dialdehydes react to form a single lactone, while in the case of unsymmetrical dialdehydes the formation of two lactones is theoretically possible. One of the two lactones may be formed in predominating or exclusive amounts, or a mixture of the two possible lactones may be produced, depending upon the particular dialdehyde employed, the specific reaction conditions, etc. The invention is generic to both possibilities.

The reaction that is effected by the process of the invention may be illustrated by the direct conversion of glutaraldehyde to delta-valerolactone, as follows:

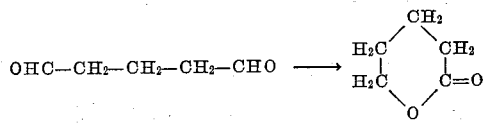

Substituent groups or atoms may be bonded to the carbon atoms of the methylene groups of the dialdehyde. Since such groups or atoms, if present, are not involved in the desired reaction, their identity, from the standpoint of the process, is unimportant. The expression "aliphatic 1,5-dialdehydes" thus is intended to be generic not only to glutaraldehyde but also to its various substitution products such as those resulting from replacement of one or more of the methylene hydrogen atoms by groups such as alkyl, aryl, alkenyl, cycloalkyl, and the like, and their substitution products. As shown hereinafter, the process is highly efficient even for the conversion of glutaraldehyde to delta-valerolactone, and it likewise may be employed for converting in an analogous manner substituted glutaraldehydes to correspondingly substituted delta-valerolactones.

The aluminum alcoholate used in the execution of the process of the invention may be prepared according to methods well-known to the art. A suitable method for the preparation of aluminum isopropoxide is described by Wilds, Organic Reactions, edited by Adams, Wiley and Sons, New York, 1944, volume II, page 198. Although aluminum isopropoxide is preferred, other aluminum alkoxides may be used, such as the alcoholates of other lower aliphatic alcohols, including those of methanol, ethanol, propanol, butanol, pentanol, propenol, isobutenol, etc. Promoters known to enhance the activity of aluminum alkoxides may be present during treatment of the dialdehyde.

For effecting conversion to the lactone, according to the process of the invention, the 1,5-dialdehyde is mixed preferably in an inert solvent or diluent medium with a small amount of the aluminum alkoxide, and the temperature of the mixture is maintained within controlled limits until reaction is substantially complete. Suitable solvents are organic solvents devoid of hydroxyl groups and other interfering groups and may be, for example, hydrocarbon solvents, preferably aromatic hydrocarbon solvents and saturated aliphatic hydrocarbon solvents, halogenated hydrocarbons, such as chlorinated aliphatic hydrocarbons, ethers, etc. Benzene is a good solvent; carbon tetrachloride likewise may be used. Other suitable solvents include, without being limited to, toluene, xylene, isopentane, chloroform, diisopropyl ether, octane, decane, isopropyl chloride, ethylene dichloride, etc. The presence of a nonhydroxylated solvent not only facilitates the mixing of the dialdehyde with the catalyst, but also aids in preventing undesired side reactions, and polymerization. The amount of the solvent, therefore, preferably is not less than about 25% of the weight of the aldehyde. Larger amounts of solvent do no harm except as excessively large amounts may overdilute the reaction mixture and thereby retard slightly the rate of reaction.

Since in the process of the invention the aluminum alkoxide acts as a true catalyst, and is not consumed in the reaction, only small amounts need be used. Molar ratios of aluminum alkoxide : dialdehyde from about 0.001 to about 0.10 are suitable. Somewhat larger amounts may be employed, although amounts greater than corresponding to molar ratios of aluminum alkoxide : dialdehyde above about 0.4 desirably are avoided because of the resulting loss in economy of operations and the increased tendency for the dialdehyde to undergo side reactions and/or to polymerize. Amounts of aluminum alkoxide corresponding to values for the said ratio from about 0.005 to about 0.07 are preferred.

It is desirable to maintain the temperature of the reaction mixture during the mixing operation and the subsequent reaction period not over about 150° C., since substantially higher temperatures tend to reduce the yield of the desired lactone and to increase the formation of undesired products. Maximum temperatures of about 60° C. are preferred in the case of glutaraldehyde and other 1,5-dialdehydes unsubstituted at the alpha carbon atoms. The isomerization reaction is exothermic. The temperature may be kept within reasonable limits by adding the dialdehyde or a solution thereof in a suitable solvent to a solution of the aluminum alkoxide in a solvent, or vice versa, and controlling the rate of addition to prevent excessive temperature rise. Agitation as by stirring the reaction mixture aids mixing of the dialdehyde and the catalyst and also facilitates dispersal of generated heat. Heat liberated by the reaction, if otherwise excessive, may be withdrawn by conducting the reaction in a suitable vessel equipped with cooling coils or a cooling jacket through which cooling fluids may be circulated. The process also may be effected in a continuous manner.

The reaction time may be varied as required, times from 2 to 20 hours generally being employed. The extent of the reaction at any given time may be determined conveniently by withdrawing a representative sample of the reaction mixture from the reaction vessel and determining according to known procedures the aldehyde content thereof relative to the initial aldehyde content, such relative value being a measure of the proportion of the original dialdehyde remaining unreacted.

After the reaction has gone to substantial completion, the aluminum alkoxide catalyst may be destroyed, if desired, by adding to the reaction mixture an amount of water approximately stoichiometrically equivalent thereto, and the mixture may be, for example, fractionally distilled under reduced pressure to recover the lactone formed in the process. Other methods for the direct recovery of the lactone are applicable, for example, extraction with a selective solvent.

Yields of delta-lactones 80% to 90% of theory may be obtained with negligible consumption of the catalyst. The present process provides an efficient and economic method for production of lactones of open-chain, aliphatic delta-oxy carboxylic acids.

The following examples will illustrate the process of the invention. The examples are intended to be illustrative of the process, and not limitations upon the invention as it is defined in the appended claims.

*Example I*

Glutaraldehyde, one mole, was added in several portions and with cooling and stirring to a solution of 0.025 mole of aluminum isopropoxide in 13.5 times its weight of carbon tetrachloride. Heat was liberated by the reaction. The temperature was kept between 25° C. and 35° C. by controlling the rate of addition of the glutaraldehyde and with the aid of cooling. After the glutaraldehyde was added, the resulting mixture was held overnight at 25° C. to 30° C. and then 0.132 mole of water (50% excess of theory) was added. A cloudy, colorless soft gel formed. The gel was transferred to a distillation flask and distilled under reduced pressure. After the carbon tetrachloride distilled, delta-valerolactone was recovered in a yield 84% of theory as a colorless liquid distilling at 66° C. to 70° C. under 0.5 millimeter mercury pressure.

Alpha,gamma-dimethyl - alpha-ethoxymethylglutaraldehyde and alpha,gamma-alpha-methoxymethylglutaraldehyde, employed in the following examples, and related 1,5-dialdehydes which can be employed in accordance with the process of the present invention may be prepared by the method disclosed and claimed in the copending application, Serial No. 16,617, filed March 23, 1948, jointly by the present inventor and Douglas G. Norton, covering Improvement in Substituted Dialdehydes and Preparation of the Same. According to the process disclosed in said copending application, novel substituted glutaraldehydes are prepared by reacting an alphamethylene aldehyde of the formula $$CH_2=C(R')-CHO$$

in which R' represents a hydrocarbon group, with an alcohol, ROH, under controlled preferably substantially anhydrous conditions in the presence of a regulated amount of a basic condensation catalyst according to the general equation:

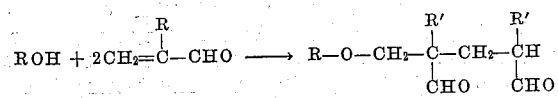

The reaction between the alcohol and the unsaturated aldehyde, which may be conducted in the presence of an inert organic solvent, is catalyzed by the presence of a small amount of a basic-acting substance, such as a hydroxide or carbonate of an alkali metal, an alkaline earth metal hydroxide, or an organic amine, such as pyridine, benzyltrimethylammonium hydroxide, piperidine, tetramethylammonium hydroxide, etc., amounts of the basic condensation catalyst to provide a concentration in the reaction mixture of from about 0.001 to 0.4 gram-equivalent per liter being generally effective, a preferred range being from about 0.01 to about 0.08 equivalent per liter. Temperatures of from about 0° C. to about 50° C. are generally suitable, a preferred range, particularly when methacrolein is used as the unsaturated aldehyde, being from about 15° C. to about 40° C. Molar ratios of the alcohol to the unsaturated aldehyde from about 1/2 to about 10/1 may be employed, a preferred range being from about 1/1 to about 5/1. The reaction may be effected by mixing the alcohol and the catalyst, and slowly adding the unsaturated aldehyde to the mixture, allowing reaction times of from about 2 to about 6 hours, more or less. The substituted glutaraldehydes produced by the reaction can be recovered from the reaction mixture by neutralizing the basic catalyst with an acid, such as formic or other suitable acid, and distilling the neutralized mixture.

The following specific procedures, which are disclosed in the aforesaid copending application, may be employed for preparing the 1,5-dialdehydes used in the following examples:

Alpha,gamma-dimethyl-alpha-methoxymethylglutaraldehyde: Dissolve sufficient NaOH (in the form of a 2 N aqueous solution solution) in 320 grams of methanol to form a solution containing 0.014 equivalent NaOH per liter. Add dropwise to the solution over a period of one hour while stirring, 140 grams of methacrolein at a temperature of about 25° C. After an additional 3 hours neutralize the NaOH by addition of the equivalent amount of formic acid, and fractionally distill. The alpha,gamma-dimethyl-alpha-methoxymethylglutaraldehyde distills at about 63° C. under 0.1 mm. mercury pressure.

Alpha,gamma-dimethyl-alpha-ethoxymethylglutaraldehyde: To a 0.005 N solution of NaOH in ethyl alcohol add slowly and with stirring 1 mole of methacrolein per mole of ethyl alcohol while maintaining the mixture at about 23° C. After about 4 hours neutralize the mixture by addition of formic acid and distill. Alpha,-gamma-dimethyl-alpha-ethoxymethylglutaraldehyde distills under a pressure of 0.5 millimeter of mercury at about 71° C. to 73° C.

Alcohols other than methyl alcohol and ethyl alcohol that can be employed for the preparation of substituted glutaraldehydes according to the process of the copending application include propyl alcohol, isopropyl alcohol, the butyl alcohols, the pentyl alcohols, the hexyl alcohols, the octyl alcohols, the nonyl alcohols and even alcohols such as decanol, dodecanol, tetradecanol, hexadecanol, and octadecanol, and their branched-chain analogs, as well as unsaturated alcohols including allyl alcohol, methallyl alcohol, crotyl alcoho, cinnamyl alcohol, 2-pentenol, 2-ethyl-2-butenol, 2-isopropyl-2-hexenol, and even propargyl alcohol and 2-methoxy ethanol. Alpha-methylene aldehydes which may be employed include, in addition to methacrolein, the following: alpha-ethylacrolein, alpha-propylacrolein, alpha-isopropylacrolein, alpha-isohexylacrolein, alpha-phenylacrolein, alpha-octylacrolein, alpha-decylacrolein, and homologous and analogous substituted acroleins wherein the alpha carbon atom is tertiary and the beta carbon atom is primary.

*Example II*

One mole of alpha,gamma-dimethyl-alpha-ethoxymethylglutaraldehyde was treated with 0.045 mole of aluminum isopropoxide in carbon tetrachloride at 30° C. to 40° C. according to the method described in Example I. Upon distillation of the mixture the novel lactone alpha,-gamma-dimethyl-gamma-ethoxymethyl-delta-valerolactone was recovered as the fraction distilling between 71° C. and 76° C. under a pressure of 0.05 millimeter of mercury. Further properties of the lactone are substantially as follows:

Boiling temperature under 1 millimeter mercury pressure_____ 95° C. to 96° C.
Refractive index ($n_D^{20}$) _____ 1.450
Infra-red absorption (liquid state) _____ Band at wave length 5.745 mu.

The lactone is a clear mobile liquid having a piquant odor, of potential value in perfume manufacture. Its volatility, or evaporation rate, was unexpectedly low and, hence, the lactone could be used advantageously as a special solvent in the high-boiling range.

*Example III*

Treatment of alpha,gamma-dimethyl-alpha-methoxymethylglutaraldehyde with aluminum isopropoxide according to the method of the preceding examples forms the novel lactone alpha,-gamma-dimethyl-gamma-methoxymethyl-delta-valerolactone, a colorless limpid liquid distilling at about 90° C. to 94° C. under 0.3 millimeter pressure and having a refractive index ($n$ 20) of substantially 1.4559 and a specific gravity (20/4) of about 1.043.

The novel ether-lactones to which the invention relates have the generic structural formula

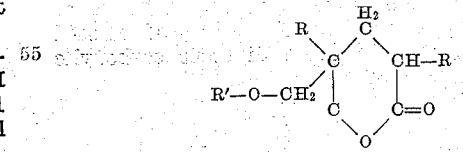

and are illustrated more specifically by the lactones prepared and described in Examples II and III. In the foregoing formula, each R represents a member of the group consisting of hydrogen and the aliphatic hydrocarbon radicals, and R' represents a hydrocarbon radical, such as ethyl, methyl, propyl, isopropyl, butyl, isobutyl, t-butyl, pentyl, and higher alkyl groups. Suitable dialdehydes from which lactones having the above formula may be prepared are disclosed and claimed in the aforesaid copending application filed jointly by the present inventor and Douglas G. Norton. The new lactones disclosed by the above formula, apparently because of the presence in the molecule of the alkoxymethyl group in the gamma position in conjunction with the substituted lactone structure, are characterized by unique and generally pleasing fragrance. They are of interest as new materials useful in the preparation of perfumery and may be employed not only to impart desirable fragrance but also to enhance the quality of perfumes and like products containing natural as well as synthetic essential oils, e. g. as fixatives. Additional novel lactones corresponding to the above generic formula are as follows: alpha,-gamma-diethyl - gamma - allyloxymethyl - delta-valerolactone, alpha,gamma-dimethyl - gamma-propoxy-delta-valerolactone, alpha, gamma - dimethyl-gamma-phenethoxy-delta - valerolactone, alpha,gamma-dimethyl - gamma - butoxy - delta-valerolactone, alpha,gamma-diisopropyl-gamma-methoxy-delta-valerolactone, and alpha,gamma-dimethyl-gamma - hydroxyethoxymethyl - delta-valerolactone. The members of the class wherein R and R' represent aliphatic hydrocarbon groups, especially those wherein the molecule contains from 9 to 20 carbon atoms, are of added interest because of their excellent solvent action and their favorable volatility characteristics. They may be employed, for example, as high-boiling solvents, useful particularly in printing inks, with the additional advantage that they not only impart no objectionable odor to the inks, but in fact, may render them pleasingly aromatic.

I claim as my invention:

1. Alpha,gamma-dimethyl- gamma - methoxymethyl-delta-valerolactone.

2. Alpha,gamma - dimethyl - gamma - ethoxymethyl-delta-valerolactone.

3. Alpha,gamma - dimethyl - gamma - alkoxymethyl-delta-valerolactone.

4. The lactones of the formula

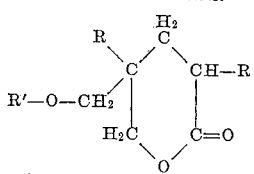

in which each R represents a member of the group consisting of hydrogen and the aliphatic hydrocarbon radicals and R' represents a hydrocarbon radical.

5. A process for the direct conversion of an aliphatic 1,5-dialdehyde to a lactone of a delta-hydroxy aliphatic carboxylic acid which comprises treating the aliphatic 1,5-dialdehyde with aluminum isopropoxide in an inert solvent devoid of hydroxyl at a temperature within the range of from about 20° C. to about 60° C. to produce said lactone of a delta-hydroxy aliphatic carboxylic acid.

6. A process for the direct conversion of glutaraldehyde to delta-valerolactone which comprises treating glutaraldehyde with aluminum isopropoxide in an inert diluent devoid of hydroxyl at a temperature within the range of from about 20° C. to about 60° C. to produce a product comprising delta-valerolactone, and distilling delta-valerolactone from the product.

7. A process for the preparation of alpha,-gamma-dimethyl-gamma-methoxymethyl- delta-valerolactone comprising acting upon alpha,-gamma-dimethyl-gamma-methoxymethyl- delta-valerolactone with an aluminum alkoxide at a temperature within the range of from about 20° C. to about 60° C. in a chlorinated hydrocarbon solvent, and distilling the products to recover alpha,gamma-dimethyl-gamma- methoxymethyl-delta-valerolactone.

8. A process for the preparation of alpha,-gamma-dimethyl-gamma - alkoxymethyl - delta-valerolactone which comprises mixing one mole of alpha,gamma-dimethyl - gamma - alkoxymethyl-glutaraldehyde with from about 0.001 to about 0.4 mole of an aluminum lower alkoxide in an inert solvent devoid of hydroxyl and maintaining the mixture at temperatures within the range of from about 20° C. to about 60° C., to produce alpha,-gamma-dimethyl-gamma - alkoxymethyl - delta-valerolactone.

9. A process for the direct conversion of aliphatic 1,5-dialdehydes to delta-lactones comprising treating in liquid phase an aliphatic 1,5-dialdehyde with an aluminum lower alcoholate to produce a lactone of a delta-oxy aliphatic carboxylic acid.

10. A process for the direct conversion of an aliphatic 1,5-dialdehyde to a delta-lactone isomeric thereto, which comprises treating said aliphatic 1,5-dialdehyde in liquid phase with from about 0.001 to about 0.4 mole of an aluminum lower alcoholate per mole of dialdehyde to produce a lactone of a delta-oxy aliphatic carboxylic acid.

11. A process for the preparation of an alpha,-gamma-dimethyl-gamma - alkoxymethyl - delta-valerolactone, which comprises treating in liquid phase an alpha,gamma-dialkyl-gamma-alkoxymethylglutaraldehyde with from about 0.001 to about 0.4 mole of an aluminum lower alkoxide to produce said alpha,gamma-dialkyl-gamma-alkoxymethyl-delta-valerolactone.

CURTIS W. SMITH.

No references cited.